(12) United States Patent
Hermann (10) Patent No.: US 11,679,440 B2
(45) Date of Patent: Jun. 20, 2023

(54) METHOD FOR PRODUCING ONE OR MORE CONCAVE CUT-OUTS ON A MAIN BODY WHICH IS, IN PARTICULAR, SUBSTANTIALLY CYLINDRICAL, ARMATURE, KEEPER PLATE, AND ELECTROMAGNETIC ACTUATOR

(71) Applicant: KENDRION (VILLINGEN) GMBH, Villingen-Schwenningen (DE)

(72) Inventor: Rolf Hermann, Villingen-Schwenningen (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 525 days.

(21) Appl. No.: 16/756,748

(22) PCT Filed: Oct. 17, 2018

(86) PCT No.: PCT/EP2018/078435
§ 371 (c)(1),
(2) Date: Apr. 16, 2020

(87) PCT Pub. No.: WO2019/076990
PCT Pub. Date: Apr. 25, 2019

(65) Prior Publication Data
US 2021/0187620 A1 Jun. 24, 2021

(30) Foreign Application Priority Data
Oct. 17, 2017 (DE) .......................... 102017124187.6

(51) Int. Cl.
*B23B 5/48* (2006.01)
*H01F 7/08* (2006.01)
(Continued)

(52) U.S. Cl.
CPC .................. *B23B 5/48* (2013.01); *B23C 3/30* (2013.01); *F16K 27/029* (2013.01);
(Continued)

(58) Field of Classification Search
CPC ....... B23B 5/48; H01F 7/081; H01F 41/0206; H01F 2007/086; H01F 7/1615;
(Continued)

(56) References Cited

U.S. PATENT DOCUMENTS

| 4,518,938 A | 5/1985 | Bartholomaus et al. |
| 5,431,514 A * | 7/1995 | Saito .................... B23Q 1/4876 409/199 |

(Continued)

FOREIGN PATENT DOCUMENTS

| CN | 205900226 U | 1/2017 |
| DE | 552204 A | 5/1932 |

(Continued)

OTHER PUBLICATIONS

Office Action dated May 17, 2022, in corresponding Japanese patent application No. 2020-521401, with English translation.
(Continued)

*Primary Examiner* — John Bastianelli
(74) *Attorney, Agent, or Firm* — Nath, Goldberg & Meyer; Jerald L. Meyer (57) ABSTRACT

A method for producing one or more concave cut-outs on a main body, which is in particular substantially cylindrical, more particularly one or more grooves on a magnetic armature, a push rod, or a magnetic keeper plate, includes the following steps:
  providing a main body, which is in particular substantially cylindrical and has a first axis of rotation,
  rotating the cylindrical main body around the first axis of rotation in a first rotational direction by means of a lathe, and (Continued)

rotating a striking tool, which is provided with a number of fly cutters, around a second axis of rotation, which extends in parallel and offset in relation to the first axis of rotation in a second rotational direction, which is opposite to the first rotational direction, in such a way that the fly cutter engages in a material-removing manner in the main body to produce the cut-out.

3 Claims, 5 Drawing Sheets

(51) Int. Cl.
| | |
|---|---|
| *H01F 41/02* | (2006.01) |
| *F16K 27/02* | (2006.01) |
| *F16K 31/06* | (2006.01) |
| *B23C 3/30* | (2006.01) |
| *B23C 3/32* | (2006.01) |
| *B23P 13/02* | (2006.01) |

(52) U.S. Cl.
CPC ......... *F16K 31/0693* (2013.01); *H01F 7/081* (2013.01); *H01F 41/0206* (2013.01); *B23C 3/32* (2013.01); *B23P 13/02* (2013.01); *H01F 2007/086* (2013.01)

(58) Field of Classification Search
CPC . H01F 7/1607; B23C 3/32; B23C 3/30; B23P 13/02; F16K 27/029; F16K 31/0693
USPC .......................................................... 29/606
See application file for complete search history.

(56) References Cited

U.S. PATENT DOCUMENTS

| | | | | |
|---|---|---|---|---|
| 8,443,704 | B2* | 5/2013 | Burke | ................. G02B 5/1852 82/131 |
| 2006/0048360 | A1* | 3/2006 | Yonemaru | ............. B23B 27/145 29/888.023 |
| 2007/0084315 | A1 | 4/2007 | Trice et al. | |
| 2019/0151961 | A1* | 5/2019 | Nishio | ...................... B23C 5/10 |

FOREIGN PATENT DOCUMENTS

| | | |
|---|---|---|
| DE | 911689 B | 5/1954 |
| DE | 3309904 A1 | 9/1984 |
| DE | 4117365 C1 | 5/1992 |
| DE | 102011056853 A1 | 6/2013 |
| DE | 102012203870 A1 | 9/2013 |
| DE | 102014113349 A1 | 3/2016 |
| EP | 2982475 A1 | 2/2016 |
| JP | 51-95680 | 8/1976 |
| JP | S59178709 A | 10/1984 |
| JP | 2004223836 A | 8/2004 |
| JP | 2009512567 A | 3/2009 |
| JP | 2010-135469 A | 6/2010 |
| JP | 201563902 A | 4/2015 |
| JP | 2015063902 A | 4/2015 |
| JP | 2016-100517 A | 5/2016 |
| WO | 2003085237 A1 | 10/2003 |
| WO | 2007/047593 A1 | 4/2007 |

OTHER PUBLICATIONS

Office Action in corresponding German application No. 102017124187.6 dated Mar. 11, 2021.

XP-002789096, "Estermals Magnet aus Kupfer erschaffen", Welt der Physik, Mar. 7, 2019, vol. 08:31.

* cited by examiner

METHOD FOR PRODUCING ONE OR MORE CONCAVE CUT-OUTS ON A MAIN BODY WHICH IS, IN PARTICULAR, SUBSTANTIALLY CYLINDRICAL, ARMATURE, KEEPER PLATE, AND ELECTROMAGNETIC ACTUATOR

This is a National Phase Application filed under 35 U.S.C. 371 as a national stage of PCT/EP2018/078435, filed Oct. 17, 2018, an application claiming the benefit of German Application No. 10 2017 124 187.6 filed Oct. 17, 2017, the content of each of which is hereby incorporated by reference in its entirety.

The present invention relates to a method for producing one or more concave cut-outs, in particular on a magnetic armature or a keeper plate; a magnetic armature, a push rod, or a keeper plate, having one or more cut-outs produced according to said method; and an electromagnetic actuator comprising a magnetic armature or a keeper plate of this type.

Electromagnetic actuators are distinguished in that they comprise a magnetic armature, which is movable between at least a first position and a second position by means of energizing of a coil unit. Such electromechanical actuators find widespread application in valves, where they block the fluid through flow in the first position and release it in the second position. For example, the valve seat can be opened and closed using a push rod, which is actuated by such an actuator. A corresponding actuator is disclosed in DE 10 2014 113 349 A1.

In many cases, the magnetic armature is mounted in a guide unit, such as a guide tube or a plain bearing, so it is movable along a longitudinal axis. In some cases, the magnetic armature is also mounted by means of an axis located therein, wherein the magnetic armature is enclosed in a ring shape by a tube, as is implemented, for example, in a so-called cartridge valve construction. The magnetic armature delimits a first section by means of a first boundary surface and delimits a second section by means of a second boundary surface in the guide or in the tube, respectively. The magnetic armature can also be longer than the guide or the tube in this case. In this case, the two boundary surfaces of the guide or the tube delimit the two sections. A fluid can be located in both sections, which is compressed or expanded upon a corresponding movement of the magnetic armature along the longitudinal axis. In particular if it is a liquid fluid, the mobility of the magnetic armature can be significantly restricted. To ensure the mobility of the magnetic armature, shorten switching times, reduce hysteresis, or decrease switching forces, the fluid has to be able to flow back and forth between the two sections. Ring gaps are typically provided for this purpose, which do not provide a sufficiently large cross section in some cases, however, to be able to ensure a sufficient fluid equalization between the two sections. Therefore, magnetic armatures are provided with drilled holes or grooves which extend between the two boundary surfaces of the magnetic armature and enable sufficient fluid equalization.

A central drilled hole is precluded in particular if a centrally arranged push rod has to be moved using the magnetic armature. An off-center drilled hole is relatively costly to produce, since usually an unfavorable drilling diameter/drilling depth ratio exists and the lathe has to stop for this purpose.

Magnetic armatures are known which comprise one or more milled grooves. These grooves are typically linear and cannot be machined later using a continuous grinding process. The milled groove has to be milled and deburred using a small shaft milling cutter, which only permits a limited feed rate, however. The lathe has to be stopped in this case, whereby parallel secondary machining is not possible. Moreover, each groove has to be milled individually as such.

The object of one embodiment of the present invention is to specify a method, using which a cut-out, in particular a groove, is to be produced cost-effectively in a magnetic armature, and which permits a high level of accuracy of the external diameter of the magnetic armature.

This object is achieved by the features specified in claims 1, 6, 7, 8, and 9. Advantageous embodiments are the subject matter of the dependent claims.

One embodiment of the invention relates to a method for producing one or more concave cut-outs on a substantially cylindrical main body, in particular one or more grooves on a magnetic armature, a push rod, or on a magnetic keeper plate, comprising the following steps:

providing an, in particular cylindrical, main body, which has a first axis of rotation, rotating the main body around the first axis of rotation in a first rotational direction by means of a lathe, and rotating a striking tool, provided with a number of fly cutters, around a second axis of rotation, which extends in parallel and offset in relation to the first axis of rotation, in a second rotational direction opposite to the first direction, so that the fly cutter and the main body primarily move in the same direction in an engagement zone in such a way that the fly cutter engages in a material-removing manner in the main body to produce the cut-out.

Striking tools having fly cutters are used in so-called polygon turning, in which a main body, which has a cylindrical cross section in most cases, is provided with a number of linear or slightly curved surfaces. For this purpose, both the main body and also the striking tool are rotated in the same rotational direction around axes of rotation extending in parallel and spaced apart in relation to one another, wherein the distance between the two axes of rotation is selected so that the striking tool engages with the fly cutters in the main body. Because of the rotation of the striking tool and the main body in the same rotational direction, the fly cutter moves in the engagement opposite to the main body and removes material from the main body as a result of the engagement. Such an application is described in WO 2003/085237 A1, in which ring grooves are manufactured on a valve housing in this manner.

In contrast thereto, according to the proposal the main body is rotated in a first rotational direction and the striking tool is rotated in a second rotational direction, wherein the first rotational direction is opposite to the second rotational direction. Similarly as with two meshing gear wheels, the main body and the striking tool primarily move in the same direction in engagement. In order that the fly cutters can engage in a material-removing manner in the main body, they have to move forward within the engagement zone with its cutting surfaces viewed in relation to the main body. The term "striking tool" also comprises milling cutters in this case, which can have the same construction as a striking tool with respect to the number and the angle interval of the blades and also diameter of the blades with respect to the milling cutter center point.

In contrast to polygon turning, flat or slightly curved surfaces are not generated, but rather clearly concave cut-outs, which have a comparatively small radius. This is advantageous in particular for the application in a magnetic armature, since at given fluid flow rate in the relatively deep concave groove, the majority of the lateral surface is maintained for the magnetic transition. In the case of surfaces which are produced using polygon turning, more magnetic armature lateral surface is lost with comparable fluid flow rate, which results in a disadvantageous reduction of the magnetic force. With the selection of the number of the fly cutters, it is possible to manufacture multiple cut-outs in the same work step, without additional cycle time being required. Known cut-outs are milled into the circumferential surface of the main body, for which purpose the lathe has to be stopped. This is not necessary according to the proposal. The lathe, which continues to run, can be used, for example, to manufacture drilled holes. In addition, to achieve a high surface roughness, the magnetic armature can also be polished by vibratory finishing after finishing the cut-out, wherein the disadvantage of the clogging of the drilled hole with polishing paste can be avoided, since a groove can be cleaned very much better in a washing procedure than a drilled hole.

The option exists according to the proposal of producing each further groove in parallel, i.e., in a cycle-time-neutral manner. A high level of accuracy of the external diameter with respect to narrow diameter tolerance and low roughness is achieved above all if the main body is subsequently through-feed ground. This is possible without problems in the case of helical cut-outs, as can be produced using one embodiment of this method.

According to a further embodiment, the method comprises the step that the striking tool is moved along the second axis of rotation in relation to the cylindrical main body. Alternatively, the main body can be moved along the first axis of rotation or the main body can be moved along the first axis of rotation and the striking tool can be moved along the second axis of rotation. In any case, in addition to the rotational movement around the first and the second axis of rotation, a translational movement takes place along the first and/or the second axis of rotation. The striking tool is therefore moved in relation to the main body along the axes of rotation. If the striking tool is only moved solely rotationally in relation to the main body, the resulting cut-outs have a width which essentially corresponds to the width of the fly cutters on the cutting faces thereof. However, if one moves the striking tool in relation to the main body along the axes of rotation, a further cut-out offset in relation to the axis of rotation of the main body results. If the cut-outs merge into one another without interruption, a groove results. In the scope of the present application, a groove is therefore to be understood as a number of cut-outs offset along the axis of rotation, which merge into one another without interruption. It is therefore possible in this embodiment to manufacture a groove over the entire length of the main body. In particular if the main body is used as a magnetic armature, a groove which extends from the first boundary surface to the second boundary surface and thus enables a fluid communication between the two sections mentioned at the outset can be manufactured by means of the proposed method by turning.

In a refined embodiment, the cylindrical main body can be rotated at a first speed and the striking tool can be rotated at a second speed, wherein the first speed and the second speed are equal or have an integer ratio to one another. If the first speed and the second speed are equal and the striking tool comprises precisely one fly cutter, one cut-out or one groove results. If the first speed and the second speed are equal and the striking tool comprises two fly cutters, two cut-outs or two grooves result. The angled arrangement of the cut-out and the grooves in relation to the circumference of the main body corresponds in this case to that of the fly cutters in the striking tool. If the second speed is twice as high as the first speed and the striking tool comprises precisely one fly cutter, two cut-outs or two grooves result, which are arranged offset by 180° in relation to one another with respect to the circumference. Therefore, the number and the angled arrangement with respect to the circumference of the main body can be determined by the number of the fly cutters and the ratio of the first and the second speed to one another.

In a refined embodiment, the cylindrical main body can be rotated at a first speed and the striking tool can be rotated at a second speed, wherein the first speed and the second speed differ from one another by a difference. As already stated above, in the scope of the present application, a groove is to be understood as a number of cut-outs, wherein the cut-outs merge into one another without interruption. In this embodiment, two adjacent cut-outs are arranged offset at an angle with respect to the circumference because of the difference of the speeds. If the striking tool and the main body are not moved in relation to one another along the axes of rotation in this case, a groove thus results, in particular a ring groove having the width of the fly cutter along the circumferential direction. If the striking tool and the main body are moved in relation to one another along the axes of rotation, a helical groove results along the lateral surface of the main body.

In a further embodiment, the main body can be magnetic, magnetized, or magnetizable. In this embodiment, the main body is particularly suitable for use in electromagnetic actuators.

One design of the invention relates to a magnetic armature for use in a magnetic or electromagnetic actuator, comprising
  a magnetic, magnetized, or magnetizable main body, and
  one or more cut-outs, which are manufactured as per a method according to one of the preceding embodiments.

One design of the invention relates to a keeper plate for use in a magnetic or electromagnetic actuator, comprising
  a magnetic, magnetized, or magnetizable main body, and
  one or more cut-outs, which are manufactured as per a method according to one of the preceding embodiments.

The technical effects and advantages which may be achieved using the magnetic armature and the keeper plate according to the proposal correspond to those which have been explained for the present method. In summary, it is to be noted that the magnetic armature may be provided with cut-outs or grooves in a cost-effective manner, without the lathe having to be stopped. In particular, a groove extending between the first and the second boundary surface may be manufactured in a cost-effective and rapid manner. With respect to the keeper plate, the cut-outs enable the flow of the plastic melt from the gate side to the side of the keeper plate located behind it.

One embodiment of the invention relates to an electromagnetic actuator, comprising
  a coil unit which can be energized, and
  a magnetic armature, mounted so it is movable in a guide unit along a longitudinal axis of the actuator, having a magnetic, magnetized, or magnetizable main body, which is movable in the energized state of the coil unit in relation to a pole core between a first position and a second position, wherein
  the magnetic armature or the guide unit delimits a first section by means of a first boundary surface and a second section by means of a second boundary surface, and the magnetic armature comprises one or more grooves extending between the first boundary surface and the second boundary surface, which is/are manufactured as per the method according to one of the above-discussed embodiments and fluidically connect/connects the first section and the second section to one another.

A further embodiment of the invention relates to an electromagnetic actuator, comprising a coil unit which can be energized, and a push rod, which is mounted so it is movable in a guide unit along a longitudinal axis of the actuator, and which is movable in the energized state of the coil unit (56) in relation to a pole core between a first position and a second position, wherein the push rod or the guide unit delimits a first section by means of a first boundary surface and a second section by means of a second boundary surface, the push rod comprises one or more grooves extending between the first boundary surface and the second boundary surface, which is/are manufactured as per the method according to one of the above-discussed embodiments and fluidically connect/connects the first section and the second section to one another.

A further embodiment of the invention relates to an electromagnetic actuator, comprising an injection-molded housing made of plastic, a coil unit, which is arranged in the housing and can be energized, a keeper plate arranged adjacent to the coil unit and in the housing, having a magnetic, magnetized, or magnetizable main body, which comprises one or more cut-outs which are manufactured as per the method according to one of the above-explained embodiments, wherein the keeper plate is overmolded to the housing and the cut-outs enable the flow of the plastic melt during the overmolding.

The technical effects and advantages which may be achieved using the two proposed embodiments of the actuator correspond to those which have been explained for the present method. In summary, it is to be noted that the magnetic armature may be provided with cut-outs or grooves in a cost-effective manner, without the lathe having to be stopped. In particular, a groove extending between the first and the second boundary surface may be manufactured in a cost-effective and rapid manner, whereby a sufficient fluid equalization between the two sections may be ensured.

Exemplary embodiments of the invention are explained in greater detail hereafter with reference to the appended drawings. In the figures

Figure 1:
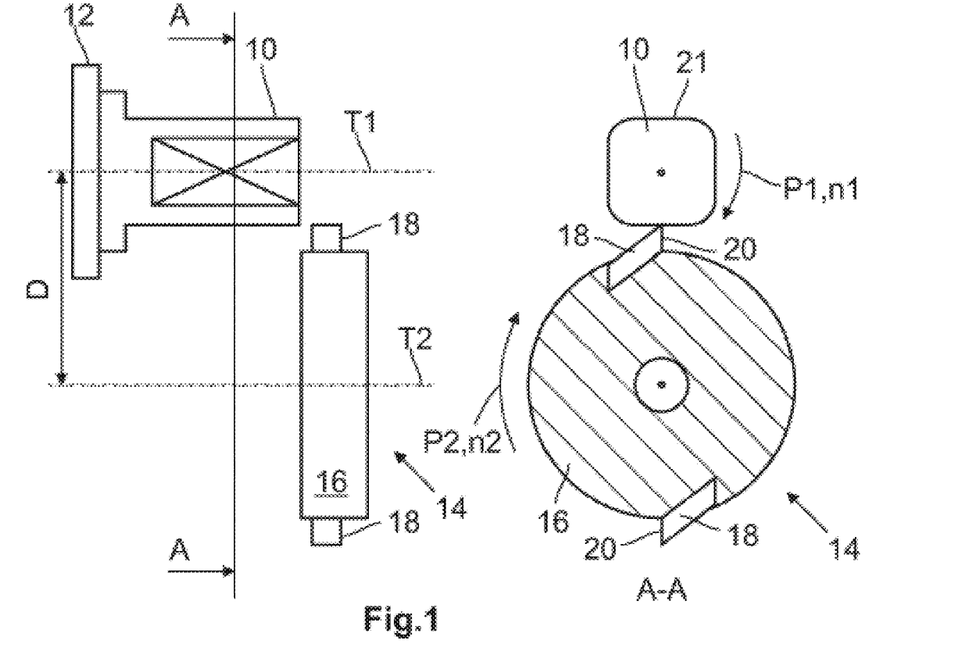
FIG. 1 shows a schematic illustration of polygon turning known from the prior art.

FIG. 1 shows polygonal turning known from the prior art on the basis of a schematic sketch. For this purpose, a main body 10, which is substantially cylindrical in the original state, is chucked in a lathe 12 and rotated at a first rotational velocity n1 around a first axis of rotation T1. Furthermore, a striking tool 14, which comprises a disk-shaped receptacle body 16, in which two fly cutters 18 are fastened, is rotated at a second rotational velocity n2 around a second axis of rotation T2. The second axis of rotation T2 extends in parallel and offset by the distance D in relation to the first axis of rotation T1. The main body 10 is rotated in a first rotational direction and the striking tool 14 is rotated in a second rotational direction, which are identified by the arrows P1 and P2. With respect to the illustration selected in FIG. 1, the main body 10 and the striking tool 14 are rotated to the right. The distance D between the first axis of rotation T1 and the second axis of rotation T2 is selected so that the fly cutters 18 can engage in a material-removing manner in the main body 10.

Because of the fact that the first rotational direction and the second rotational direction are identical, the main body 10 primarily moves in the opposite direction to the fly cutters 18 in the engagement zone. The engagement zone is to be understood here as the region of the main body 10 which is passed over or passed through by the fly cutters 18. The fly cutters 18 each comprise a cutting face 20, using which they remove the material when engaged with the main body 10. The cutting faces 20 are arranged in relation to the circumference of the receptacle body 16 so that they are moved forward. A flat or slightly curved surface results on the main body 10 because of the material-removing engagement.

The striking tool 14 comprises two fly cutters 18. If the first rotational velocity n1 is equal to the second rotational velocity n2, two of the flat or slightly curved surfaces 21 result on the main body 10. However, in the example shown in FIG. 1, the second rotational velocity n2 is twice the first rotational velocity n1, so that four of the flat or slightly curved surfaces 21 result.

Figure 2:
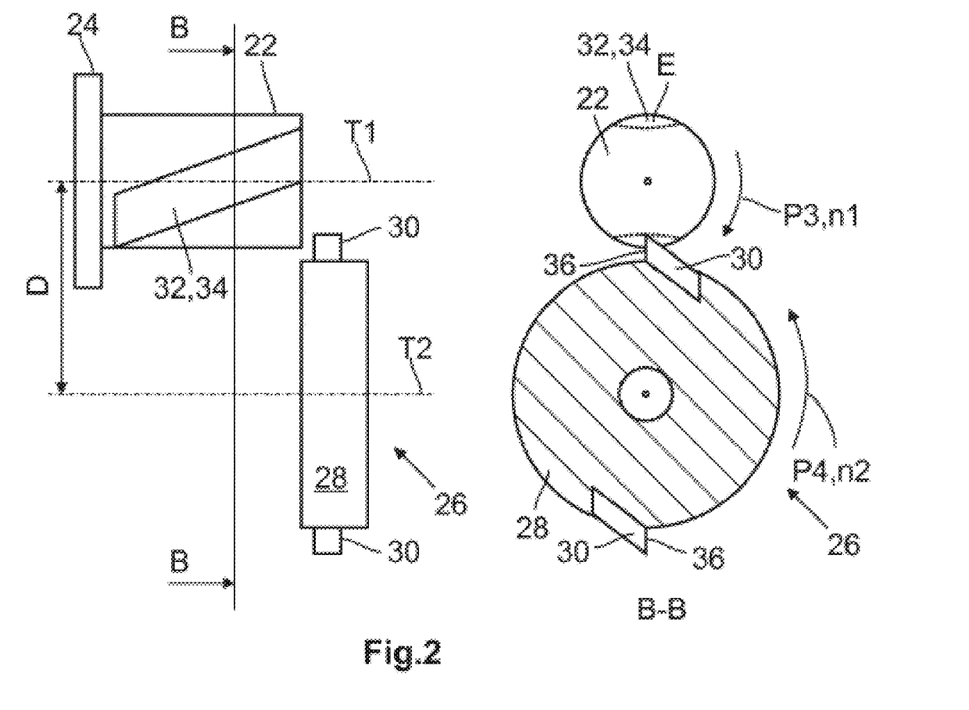
FIG. 2 shows a schematic illustration of a first embodiment of the method according to the invention.

FIG. 2 shows a schematic illustration of a first exemplary embodiment of the method according to the invention. A main body 22, which is typically substantially cylindrical in the original state, is also chucked in a lathe 24 and rotated around a first axis of rotation T1 here. However, it is also possible to use main bodies 22 having a different cross section, for example, elliptical or polygonal. Furthermore, a striking tool 26 is rotated around a second axis of rotation T2, which extends spaced apart by the distance D and in parallel to the first axis of rotation T1. The striking tool 26 comprises two fly cutters 30 in the illustrated example, which are fastened on a disk-shaped receptacle body 28 distributed uniformly over its circumference. The distance of the two axes of rotation T1, T2 is dimensioned so that the fly cutters 30 can engage within an engagement zone E in the main body 22.

The main body 22 is rotated in a first rotational direction and the striking tool 26 is rotated in a second rotational direction. The rotational directions are identified by the arrows P3 and P4. With respect to FIG. 2, the main body 22 is rotated to the right and the striking tool 26 is rotated to the left. As with meshing gear wheels, the rotation in opposing directions has the result that the fly cutters 30 and the main body 22 primarily move in the same direction in the engagement zone E.

In addition to the rotation around the second axis of rotation T2, the striking tool 26 is also moved along the second axis of rotation T2. Without the movement along the second axis of rotation T2, a concave cut-out 32, which has a width which approximately corresponds to the width of the fly cutter 30, will result as a consequence of the engagement of the fly cutters 30 in the main body 22. However, since the striking tool 26 is moreover moved along the second axis of rotation T2, a further cut-out 32 results upon each engagement, which is arranged offset in relation to the previously resulting cut-out 32 with respect to the first axis of rotation T1. The velocity at which the striking tool 26 is moved along the second axis of rotation T2 is selected in this case so that two adjacent cut-outs 32 merge into one another without interruption. As a consequence, a groove 34 results, which is formed by a plurality of cut-outs 32 merging into one another.

The main body 22 is rotated at a first rotational velocity n1 and the striking tool 26 is rotated at a second rotational velocity n2. If the two rotational velocities n1, n2 are equal, two cut-outs 32 thus result on the main body 22, since the striking tool 26 comprises two fly cutters 30. Since the two fly cutters 30 enclose an angle of 180° with respect to the circumference of the receptacle body 28, the cut-outs 32 also enclose an angle of 180° in a plane extending perpendicularly to the first axis of rotation T1.

If the two rotational velocities n1, n2 differ from one another, two adjacent cut-outs 32 are thus situated offset over the circumference of the main body 22. If the striking tool 26 is not moved along the second axis of rotation T2 in this case, a groove 34 results, which extends along the circumference of the main body 22 in a plane extending perpendicularly to the first axis of rotation T1.

If the two rotational velocities n1, n2 differ from one another and if the striking tool 26 is moved along the second axis of rotation T2, a helical groove 34 thus results, approximately as shown in FIG. 2. However, to ensure an uninterrupted transition of two adjacent cut-outs 32, the velocity at which the striking tool 26 is moved along the second axis of rotation T2 cannot be excessively large. Moreover, the first and the second rotational velocity n1, n2 cannot differ excessively strongly from one another. A difference Δn in the rotational velocities n1, n2 of ±0.1% has proven to be advantageous, but can vary in dependence on the helix angle, feed rate per fly cutter, and length of the main body 22. With increasing difference Δn, the groove 34 has a stepped profile which becomes more and more strongly pronounced. In the case of an excessively large difference Δn, two adjacent cut-outs 32 are no longer connected to one another.

Figure 3:
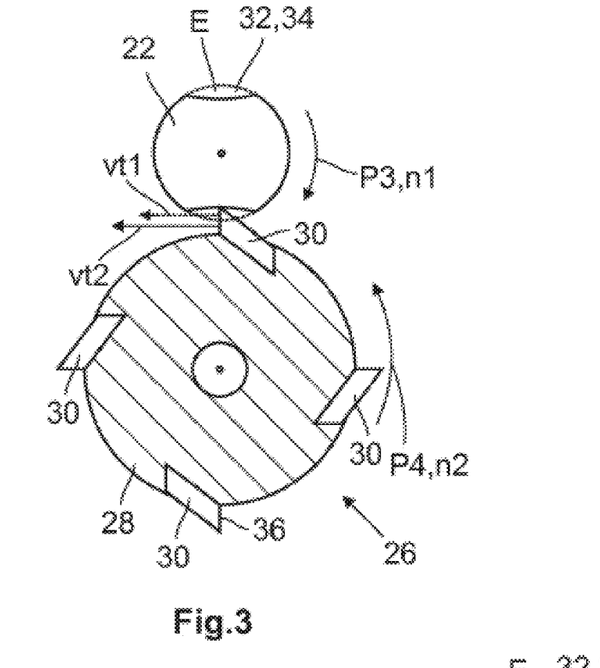
FIG. 3 shows a schematic illustration of a second embodiment of the method according to the invention.

FIG. 3 shows a second embodiment of the method according to the invention on the basis of a schematic illustration. In this exemplary embodiment, the striking tool 26 comprises a total of four fly cutters 30, which are arranged distributed uniformly over the circumference of the receptacle body 28. As already explained, the main body 22 and the striking tool 26 are rotated in different rotational directions. The fly cutters 30 comprise cutting faces 36, which are oriented in the exemplary embodiment shown in FIG. 3 so that they are moved forward during the rotation of the receptacle body 28. It is to be presumed hereafter that the first rotational velocity n1 and the second rotational velocity n2 are equal. In order that the fly cutters 30 can engage in a material-removing manner in the main body 22, the fly cutters 30 have to move forward with the cutting faces 36 thereof viewed in relation to the main body 22 within the engagement zone E. This is achieved in the exemplary embodiment shown in FIG. 3 in that the fly cutters 30 are arranged at a distance to the second axis of rotation T2 which is greater than the distance of the material in the engagement zone E to the first axis of rotation T1. The second tangential velocity vt2 of the fly cutter 30 is therefore greater than the first rotational velocity vt1 of the material of the main body 22 in the engagement zone E. FIG. 3 approximately indicates the ratios of the first tangential velocity vt1 of the material in the engagement zone E and the second tangential velocity vt2 of the fly cutters 30.

Figure 4:
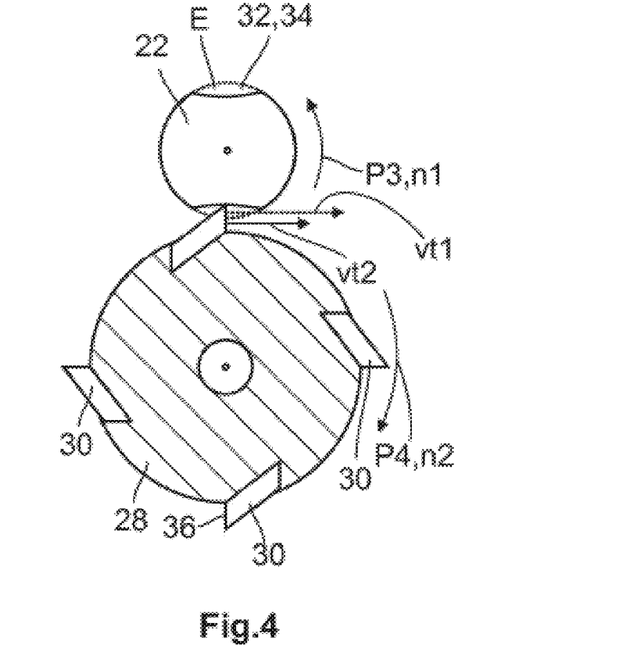
FIG. 4 shows a schematic illustration of a third embodiment of the method according to the invention.

FIG. 4 shows a third embodiment of the method according to the invention on the basis of a schematic illustration. The striking tool 26 again comprises four fly cutters 30, which are arranged in this case, however, so that the cutting faces 36 are moved in reverse, i.e., in the opposite direction, during the rotation of the striking tool 26. In order that the opposing rotational directions according to the invention of striking tool 26 and main body 22 again take place, the main body also has to be moved in reverse, i.e., in the opposite direction. This is important in the selection of the striking tool and the lathe, because there are counterclockwise and clock-wise striking tools, which differ in the arrangement of the blades. The striking tool which has to be selected is in turn dependent on where in the lathe the drive for the striking tool is seated and in which rotational direction one wishes to have the lathe run.

In order that a material-removing engagement can nonetheless take place in the engagement zone E, the first rotational velocity n1 of the main body 22 has to be selected in relation to the second rotational velocity n2 so that the first tangential velocity vt1 of the material of the main body 22 in the engagement zone E is higher than the second tangential velocity vt2 of the cutting faces 36. The material is therefore moved toward the cutting faces 36 in the engagement zone E.

The depth and the width of the cut-outs 32 and/or the grooves 34 can be set via the distance D of the two axes of rotation T1, T2 in relation to one another and via the diameter of the striking tool 26 and the main body 22.

Figure 5:
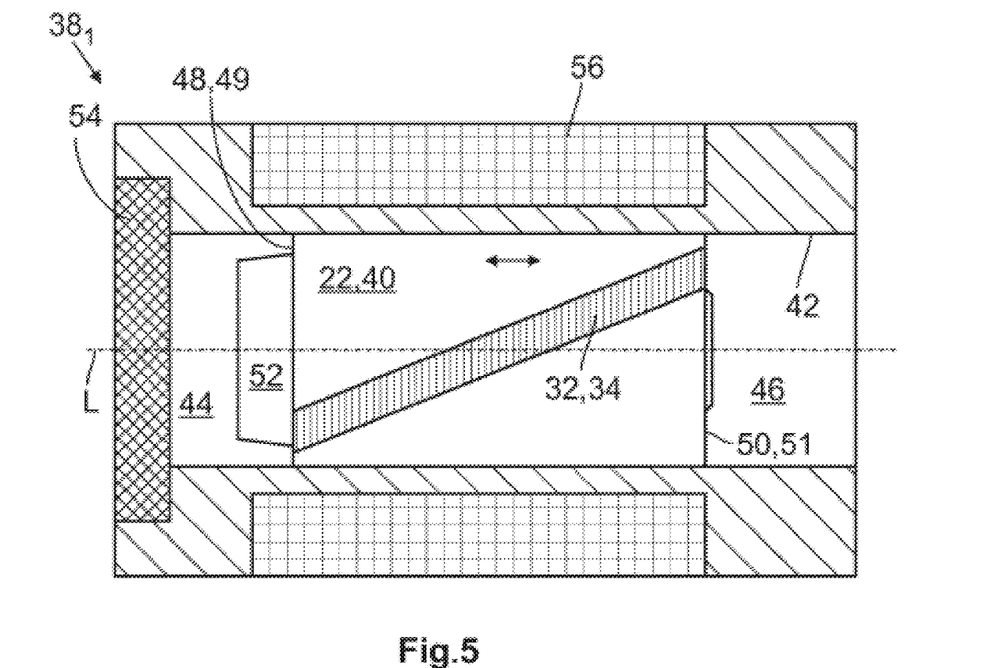
FIG. 5 shows a schematic illustration of a first embodiment of an electromagnetic actuator having a magnetic armature which has been machined using the method according to the invention.

FIG. 5 shows a schematic illustration of a first exemplary embodiment of an electromagnetic actuator $38_1$ having a substantially cylindrical magnetic armature 40, which has been produced from an originally cylindrical main body 22 using the method according to the invention. The magnetic armature 40 is mounted in a guide unit 42, which is designed here as a guide tube, so it is movable along a longitudinal axis L. The magnetic armature 40 divides the guide unit 42 into a first section 44 and a second section 46, wherein the magnetic armature 40 comprises a first boundary surface 48, which faces toward the first section 44, and a second boundary surface 50, which faces toward the second section 46. In this case, the first boundary surface 48 is formed by a first end face 49 and the second boundary surface 50 is formed by a second end face 51 of the magnetic armature. The magnetic armature 40 is provided with a helical groove 34, which extends between the first boundary surface 48 and the second boundary surface 50. Depending on the area of application, the first section 44 and the second section 46 are filled with a gaseous or liquid fluid. In addition, the magnetic armature 40 comprises a receptacle 52, via which a push rod (not shown) can be fastened.

Furthermore, the actuator 38₁ comprises a pole core 54 and a coil unit 56, which can be energized. To move the magnetic armature 40, the coil unit 56 is energized, whereby the magnetic armature 40 moves along the longitudinal axis L toward the pole core 54 or away from it. It can be seen that the first section 44 is delimited by the first end face 49 of the magnetic armature 40, by the guide unit 42, and by the pole core 54. If the magnetic armature 40 is moved toward the pole core 54, the fluid would thus be compressed in the first section 44. If the magnetic armature 40 is moved away from the pole core 54, the fluid in the first section 44 would be expanded. In both cases, the mobility of the magnetic armature 40 would be restricted. However, since the magnetic armature 40 is provided with the groove 34 extending between the first and the second boundary surface 48, 50, a fluid equalization is ensured between the first and the second section 44, 46, so that the fluid in the first section 44 is not compressed or expanded during the movement of the magnetic armature 40. The mobility of the magnetic armature 40 is thus ensured.

Because of the helical groove 34, the magnetic armature 40 is slightly rotated around the longitudinal axis L as it moves along it, whereby the wear of the magnetic armature 40 is distributed onto a larger surface. The operating time can be lengthened in this way.

Figure 6:
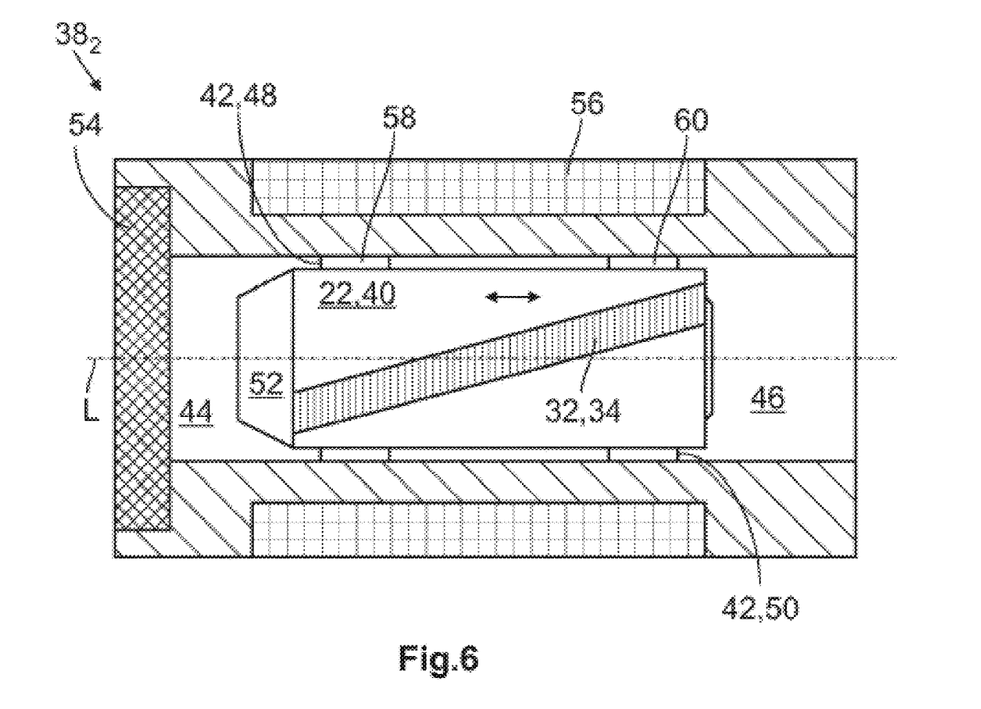
FIG. 6 shows a schematic illustration of a second embodiment of an electromagnetic actuator having a magnetic armature which has been machined using the method according to the invention.

FIG. 6 shows a schematic illustration of a second exemplary embodiment of an electromagnetic actuator 38₂, which substantially has the same construction as the actuator 38₁ according to the first exemplary embodiment. However, the guide unit 42 is constructed differently. The guide unit 42 comprises a first plain bearing 58 and a second plain bearing 60. The first plain bearing 58 forms the first boundary surface 48, while the second plain bearing 60 forms the second boundary surface 50. The functionality of the actuator 38₂ is the same as that of the actuator 38₁ according to the first exemplary embodiment.

Figure 7:
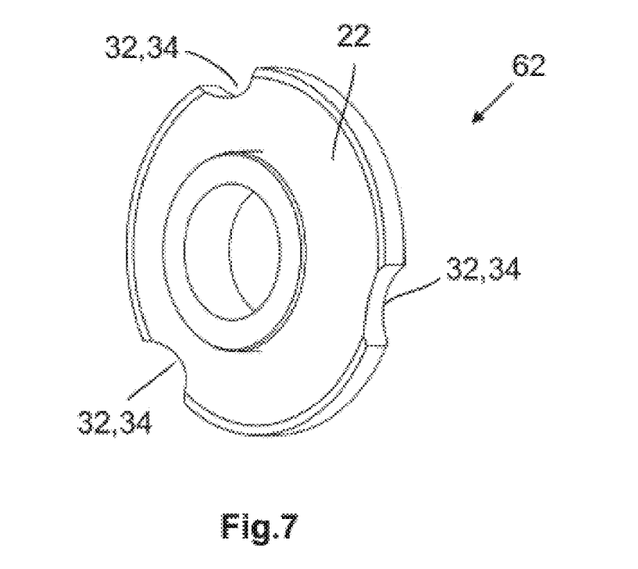
FIG. 7 shows a schematic illustration of a keeper plate which has been machined using the method according to the invention.

FIG. 7 shows a perspective illustration of a keeper plate 62. The keeper plate 62 also comprises the cylindrical main body 22, which is formed disk-shaped here. A total of three of the cut-outs 32, which have been produced according to one of the above-described methods, are arranged originating from the lateral surfaces. In this case, the cut-outs 32 are each formed as a linear groove 34.

Figure 8:
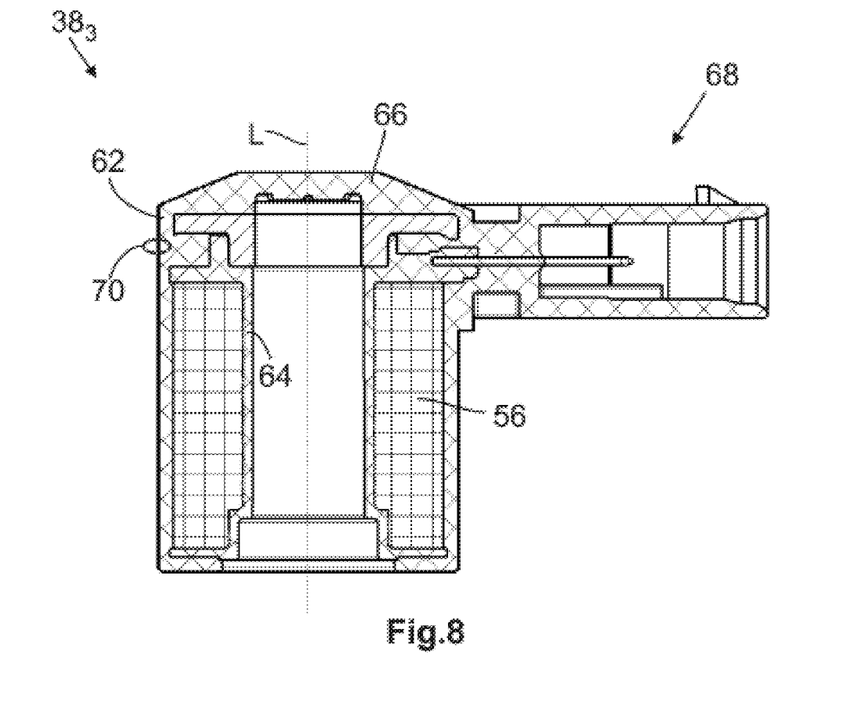
FIG. 8 shows a sectional illustration of a third embodiment of an electromagnetic actuator having a keeper plate which has been machined using the method according to the invention.

FIG. 8 shows a third exemplary embodiment of an actuator 38₃ on the basis of a sectional illustration. The actuator 38₃ comprises, like the actuators 38₁, 38₂ according to the other exemplary embodiments as well, the coil unit 56, which is wound onto a coil carrier 64. Moreover, the actuator 38₃ comprises the keeper plate 62 shown in FIG. 7, around which an injection-molded housing 66 made of plastic is overmolded. The housing 66 forms a plug receptacle 68 to supply the actuator 38₃ with electrical energy and in particular to energize the coil unit 56.

The approximate location of the gate 70 of the housing 66 is identified in FIG. 8. It can be seen that the gate 70 is located between the coil carrier 64 and the keeper plate 62. The cut-outs 32 ensure that the liquefied plastic can flow during the injection molding from the gate 70 into the sections of the housing 66 located behind the keeper plate 62 viewed from the coil carrier 64.

Furthermore, it can be seen that the keeper plate 62 terminates flush with the housing 66 in the radial direction. In this way, the keeper plate 62 can be connected to electrical contacts and the magnetic field lines can be conducted optimally through the housing 66 to the coil unit 56.

Figure 9:
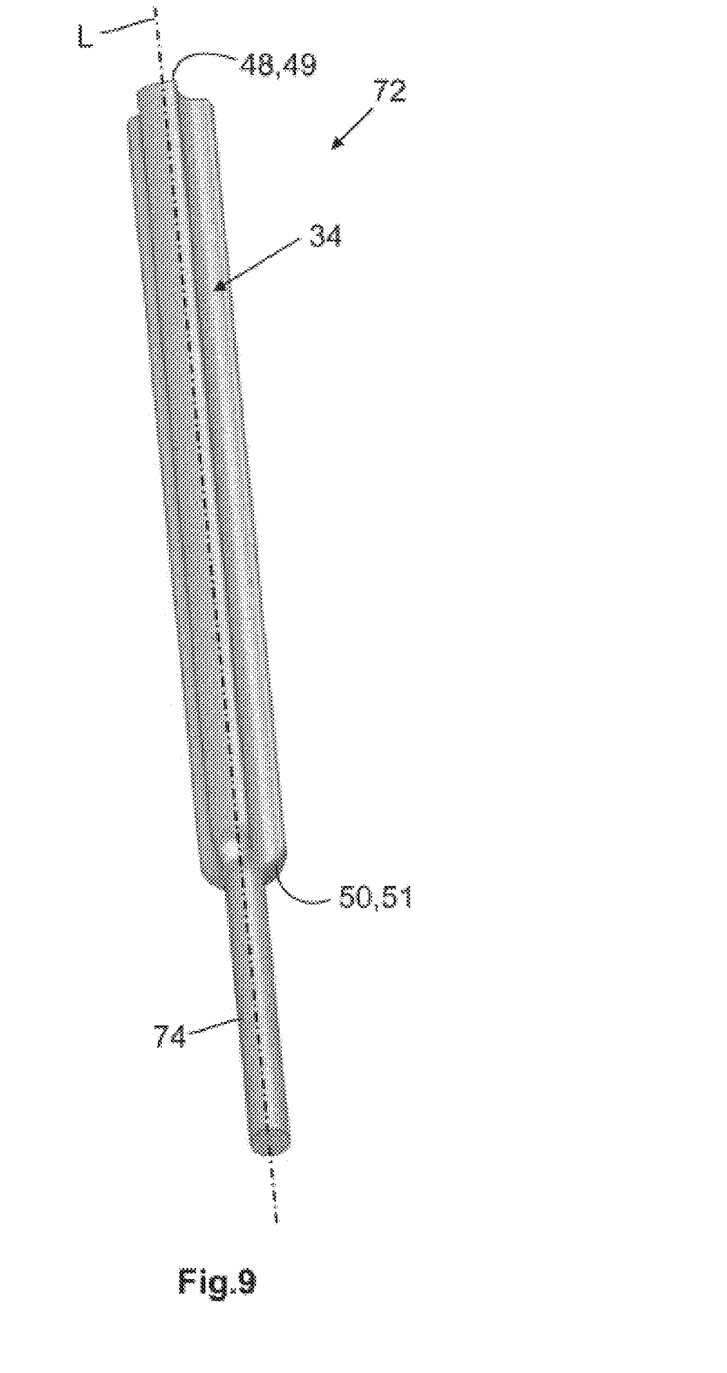
FIG. 9 shows a perspective illustration of a push rod which has been machined using the method according to the invention.

A push rod 72, also referred to as an axis, is shown on the basis of a perspective illustration in FIG. 9. The schematic construction of the push rod 72 is equivalent to that of the magnetic armature 40 shown in FIGS. 5 and 6, however, the push rod comprises a rod-shaped section 74, using which, for example, a valve body can be actuated. The push rod 72, like the magnetic armature 40 shown in FIG. 6, can be mounted so it is movable along the longitudinal axis L by means of plain bearings 58, 60 or by means of another bearing in the actuator 38. The push rod also comprises the first boundary surface 48 and the second boundary surface 50, which are formed as the first end face 49 and the second end face 51. In the illustrated exemplary embodiment, three cut-outs 32, which have been produced using the method according to the invention, extend between the first end face 49 and the second end face 51. In contrast to the magnetic armature 40, the cut-outs 32 do not extend in a helix, but rather extend linearly. The push rod 72 can be manufactured from a metallic material, for example, from a nonmagnetic stainless steel or brass. The push rod can also be manufactured from a magnetic material, however, the push rod 72 cannot be arranged in the magnetic circuit depending on the installation situation. In this case, a magnetic material could cause a magnetic short-circuit.

LIST OF REFERENCE SIGNS 10 main body
12 lathe
14 striking tool
16 receptacle body
18 fly cutter
20 cutting face
21 surface
22 main body
24 lathe
26 striking tool
28 receptacle body
30 fly cutter
32 cut-out
34 groove
36 cutting face
38, 38₁-38₃ actuator
40 magnetic armature
42 guide tube
44 first section
46 second section
48 first boundary surface
49 first end face
50 second boundary surface
51 second end face
52 receptacle
54 pole core
56 coil unit
58 first plain bearing
60 second plain bearing
62 keeper plate
64 coil carrier
66 housing
68 plug receptacle
70 gate
72 push rod
74 cylindrical section
D distance
E engagement zone
L longitudinal axis
n1 first rotational velocity
n2 second rotational velocity
Δn difference of the rotational velocities P arrow
T1 first axis of rotation
T2 second axis of rotation
vt1 first tangential velocity
vt2 second tangential velocity

The invention claimed is:

1. A method for producing one or more concave cut-outs (32) on a cylindrical main body (22) of a magnetic armature (40), a push rod (72), or a magnetic keeper plate (62) made of a magnetic, magnetized or magnetizable material, comprising the following steps:

providing the cylindrical main body (22), which has a first axis of rotation (T1);

rotating the cylindrical main body (22) around the first axis of rotation (T1) in a first rotational direction by means of a lathe (24);

rotating a striking tool (26), which is provided with a number of fly cutters (30), around a second axis of rotation (T2), which extends in parallel and offset in relation to the first axis of rotation (T1) in a second rotational direction, which is opposite to the first rotational direction, so that the fly cutter (30) and the main body (22) primarily move in the same direction within an engagement zone (E), in such a way that the fly cutter (30) engages in a material-removing manner in the main body (22) to produce the one or more concave cut-outs (32); and moving the striking tool (26) in relation to the cylindrical main body (22) along the second axis of rotation (T2), wherein the one or more concave cut-outs (32) comprise a plurality of concave cut-outs (32), and wherein a speed at which the striking tool (26) is moved along the second axis of rotation (T2) is selected in such a way that two adjacent ones of the plurality of concave cut-outs (32) merge into one another without interruption, so that a groove (34) is formed, which consists of a plurality of merging ones of the concave cut-outs (32).

2. The method as claimed in claim 1,
characterized in that the cylindrical main body (22) is rotated at a first speed (n1) and the striking tool (26) is rotated at a second speed (n2), wherein the first speed (n1) and the second speed (n2) are equal or have an integer ratio to one another.

3. The method as claimed in claim 1,
characterized in that the cylindrical main body (22) is rotated at a first speed (n1) and the striking tool (26) is rotated at a second speed (n2), wherein the first speed (n1) and the second speed (n2) differ from one another by a difference (Δn).

* * * * *